United States Patent
Turnquist et al.

[11] Patent Number: 5,971,400
[45] Date of Patent: Oct. 26, 1999

[54] SEAL ASSEMBLY AND ROTARY MACHINE CONTAINING SUCH SEAL ASSEMBLY

[75] Inventors: Norman Arnold Turnquist, Cobleskill; Osman Saim Dinc, Troy; Ziqiang Hu, Niskayuna; James Louis Lawen, Jr.; George Ernest Reluzco, both of Schenectady; Ming Zhou, Niskayuna, all of N.Y.

[73] Assignee: General Electric Company, Schenectady, N.Y.

[21] Appl. No.: 09/131,486

[22] Filed: Aug. 10, 1998

[51] Int. Cl.$^6$ ........................................ F16J 15/447
[52] U.S. Cl. ..................... 277/416; 277/421; 277/422; 415/174.5
[58] Field of Search ..................... 277/416, 421, 277/422, 493, 543; 415/173.3, 173.5, 174.2, 174.5

[56] References Cited

U.S. PATENT DOCUMENTS

| | | |
|---|---|---|
| 2,398,270 | 4/1946 | Zahodiakin . |
| 3,625,526 | 12/1971 | McCormick . |
| 4,436,311 | 3/1984 | Brandon . |
| 4,551,064 | 11/1985 | Pask . |
| 4,752,184 | 6/1988 | Liang . |
| 4,916,892 | 4/1990 | Pope . |
| 5,002,288 | 3/1991 | Morrison et al. . |
| 5,395,124 | 3/1995 | Brandon . |
| 5,464,226 | 11/1995 | Dalton . |
| 5,487,549 | 1/1996 | Dalton et al. . |
| 5,810,365 | 9/1998 | Brandon et al. . |

FOREIGN PATENT DOCUMENTS 2301635  12/1996  United Kingdom .

Primary Examiner—Anthony Knight
Assistant Examiner—John L. Beres
Attorney, Agent, or Firm—Douglas E. Erickson; Marvin Snyder

[57] ABSTRACT

A seal assembly and a rotary machine, such as a steam turbine, containing the seal assembly. A casing circumferentially surrounds a rotor and includes a circumferential channel open to the rotor. Seal segments are circumferentially arrayed in the channel and are movable between radially inward and outward positions. Circumferentially adjacent seal segments have circumferentially opposing surface grooves. A resilient and imperforate member is engaged in the grooves of circumferentially-adjacent seal segments circumferentially urging apart such segments and providing sealing between such segments.

20 Claims, 4 Drawing Sheets

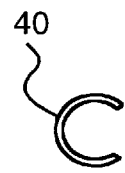
FIG. 5
FIG. 6
FIG. 7
FIG. 8

SEAL ASSEMBLY AND ROTARY MACHINE CONTAINING SUCH SEAL ASSEMBLY

FIELD OF THE INVENTION

The present invention relates generally to rotary machines, and more particularly to a seal assembly for a rotary machine and to a rotary machine containing such seal assembly.

BACKGROUND OF THE INVENTION

Rotary machines include, without limitation, turbines for steam turbines and compressors and turbines for gas turbines. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known to position variable-clearance labyrinth-seal segments in a circumferential array between the rotor of the turbine and the circumferentially surrounding casing to minimize steam-path leakage. The ends of coil springs engage circumferentially-opposing and generally-matching holes in circumferentially-adjacent seal segments. The coil springs circumferentially urge apart circumferentially-adjacent seal segments. Such circumferentially-urging-apart causes the seal segments to move radially outward within a channel in the casing. This prevents damage to the labyrinth-seal teeth from transient radial movement of the rotor during turbine startup. As the rotor reaches steady-state operating conditions, steam pressure builds up in the turbine, and such pressurized fluid enters the channel and pushes the seal segments radially inward such that the labyrinth-seal teeth are in close proximity to the rotor for more efficient sealing. Designs have been proposed which add brush-seal bristles to a labyrinth seal segment.

SUMMARY OF THE INVENTION

In a first preferred embodiment, the seal assembly of the invention is for a rotary machine. The rotary machine includes a rotor and a casing. The rotor has a generally longitudinally-extending axis. The casing is generally coaxially aligned with the axis, circumferentially surrounds and is radially spaced apart from the rotor, and includes an inner circumferential channel which is generally coaxially aligned with and open to the rotor. The seal assembly includes seal segments and a resilient and imperforate member. The seal segments may be positioned in a circumferential array in the channel and, when so positioned, the seal segments are movable between a radially inward position near the rotor and a radially outward position. Circumferentially-adjacent seal segments have circumferentially-opposing and generally matching surface grooves. The member may be positioned in the grooves of the circumferentially-adjacent seal segments and, when so positioned, the member circumferentially urges apart the circumferentially-adjacent seal segments.

In a second preferred embodiment, the rotary machine of the invention includes a rotor, a casing, seal segments, and a resilient and imperforate member. The rotor has a generally longitudinally-extending axis. The casing is generally coaxially aligned with the axis, circumferentially surrounds and is radially spaced apart from the rotor, and includes an inner circumferential channel which is generally coaxially aligned with and open to the rotor. The seal segments are circumferentially arrayed in the channel and are movable between a radially inward position near the rotor and a radially outward position. Circumferentially-adjacent seal segments have circumferentially-opposing and generally matching surface grooves. The member is positioned in the grooves of the circumferentially-adjacent seal segments and circumferentially urges apart the circumferentially-adjacent seal segments.

Several benefits and advantages are derived from the invention. The resilient and imperforate members provide a seal between circumferentially-adjacent seal segments minimizing leakage therebetween. The resilient and imperforate members also provide a spring to circumferentially urge apart circumferentially-adjacent seal segments.

DESCRIPTION OF THE DRAWINGS

FIG. is a schematic, above-axis, longitudinal cross-sectional view of a preferred embodiment of the present invention showing the circumferential end of a seal segment and casing segment together with the cross-sectioned rotor and member, wherein the seal segment is in a radially outward position;

FIG. 5 is a perspective view of the member shown in FIGS. 1 and 3;

FIG. 6 is an end view of the member of FIG. 5;

FIG. 7 is a perspective view of another embodiment of the member of FIG. 5;

FIG. 8 is an end view of the member of FIG. 7; and

DETAILED DESCRIPTION OF THE INVENTION

Figure 1:
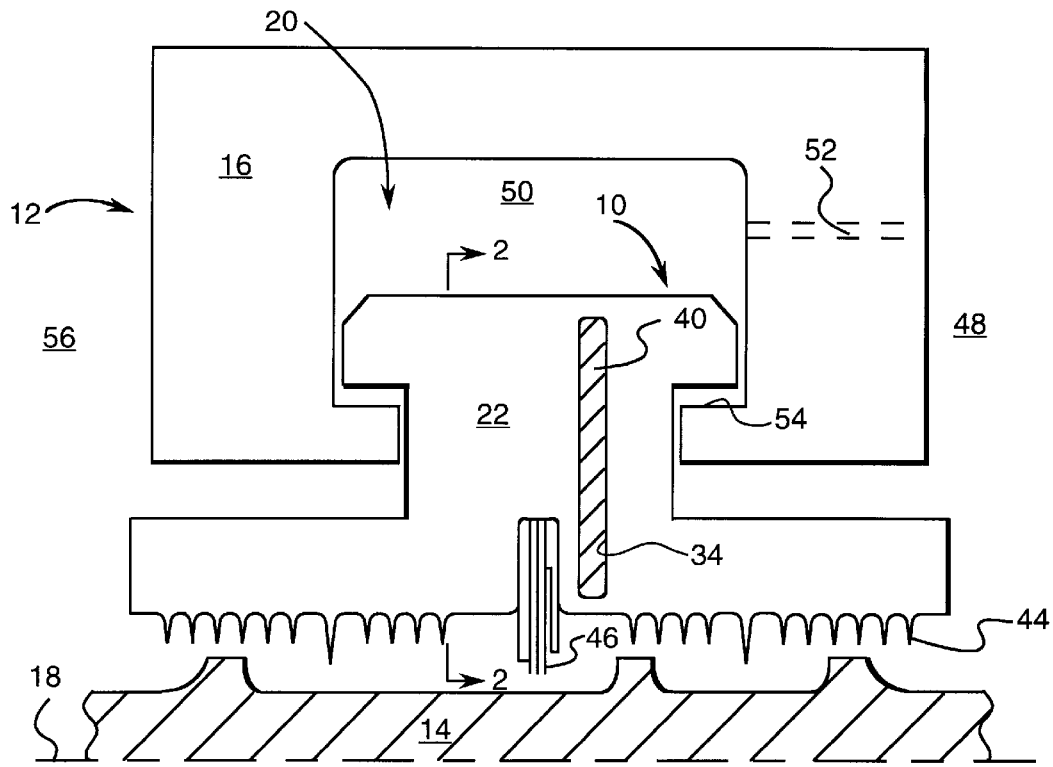

Referring now to the drawings, FIGS. 1–8 schematically show a preferred embodiment of the seal assembly 10 and the rotary machine 12 of the present invention. The rotary machine 12, only a portion of which is shown in the figures, includes a rotor 14, a casing 16, and the seal assembly 10. The term "rotor" includes shaft, disk, wheel, and the like. The rotor 14 may, without limitation, be constructed as a single monolithic rotor or as two or more longitudinally-attached rotor segments. Likewise, the casing 16 may, without limitation, be a single monolithic casing or attached-together longitudinal casing segments and/or attached-together circumferential casing segments. Preferably, the rotor 14 is a steam-turbine rotor, and the casing 16 is a steam-turbine casing. The rotor 14 has a generally longitudinally-extending axis 18. The casing 16 is generally coaxially aligned with the axis 18, circumferentially surrounds and is radially spaced apart from the rotor 14, and includes an inner circumferential channel 20 which is generally coaxially aligned with and open to the rotor 14.

Figure 3:
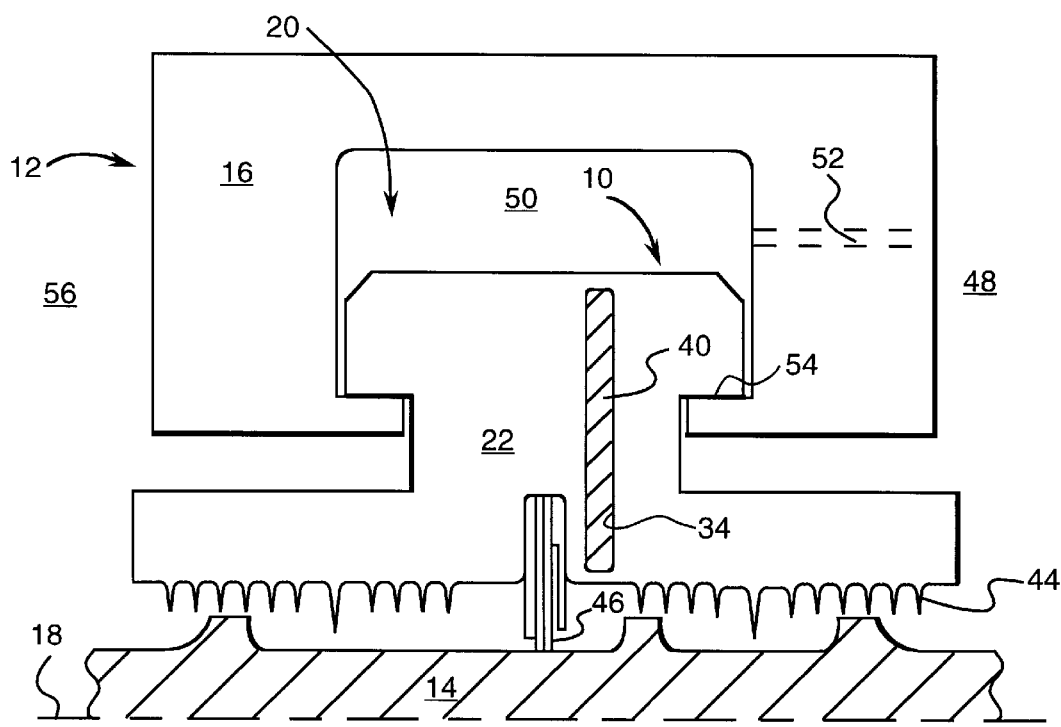
FIG. 3 is a view, as in FIG. 1, but with the seal segment shown in a radially inward position.
Figure 4:
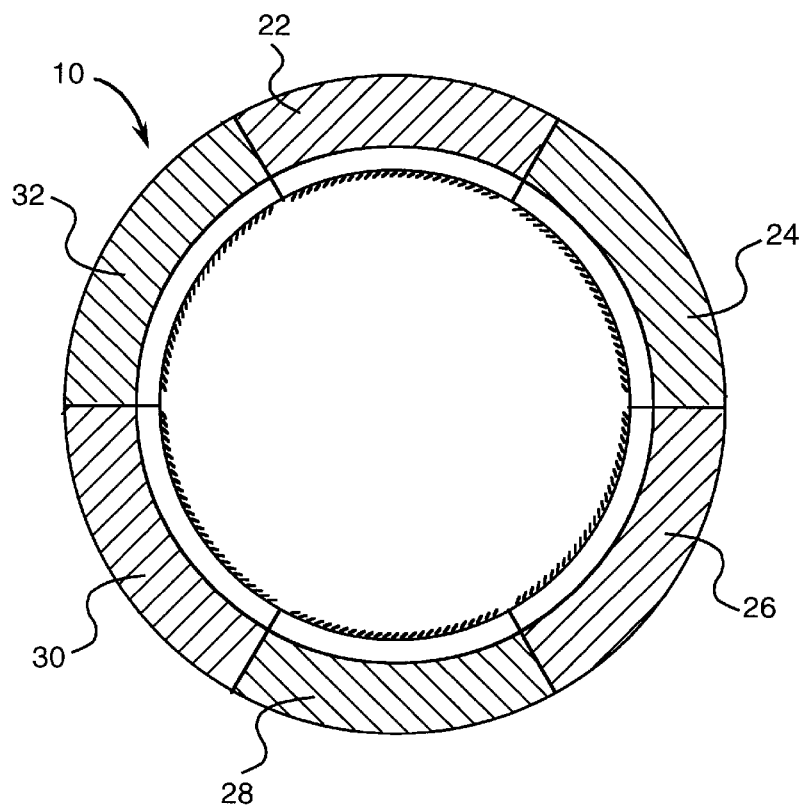
FIG. 4 is a review, as in FIG. 2, but with the seal segments shown in their radially inward positions.

The seal assembly 10 includes a plurality of seal segments 22, 24, 26, 28, 30, and 32 disposable in a circumferential array in the channel 20 and, when so disposed (i.e., when installed in the rotary machine 12), the plurality of seal segments 22, 24, 26, 28, 30, and 32 are movable between a radially inward position (seen in FIG. 3) proximate the rotor 14 and a radially outward position (seen in FIG. 1). When installed in the rotary machine 12, the plurality of seal segments 22, 24, 26, 28, 30, and 32 are said to be circumferentially arrayed in the channel 20. Circumferentially-adjacent seal segments (such as seal segments 22 and 24) have circumferentially-opposing and generally matching surface grooves (such as groove 34 of seal segment 22). A preferred surface groove is one having a straight-line length across the surface which is greater than its depth beneath the surface. Preferably, the grooves (such as groove 34 of seal segment 22) are generally radially aligned (as seen in FIGS. 1 and 3). When installed in the rotary machine 12, the seal segments 22, 24, 26, 28, 30, and 32 have a radial extent, and the grooves (such as groove 34 of seal segment 22) of circumferentially-adjacent seal segments (such as seal segments 22 and 24) extend a radial distance equal to at least three-quarters of the radial extend of the seal segments 22, 24, 26, 28, 30, and 32.

Figure 9:
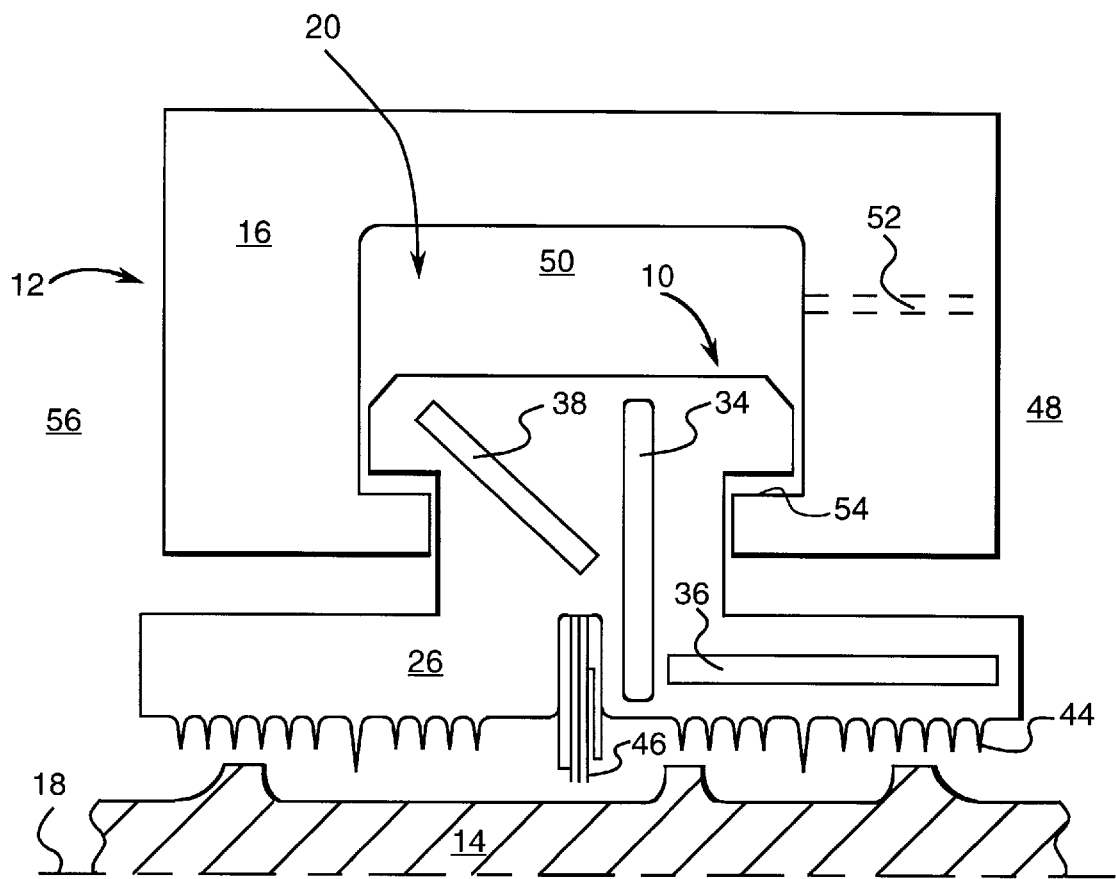
FIG. 9 is a view, as in FIG. 1, showing the circumferential end another seal segment having two additional grooves wherein the members have been removed from the grooves.

In a first alternate arrangement, the grooves of circumferentially-adjacent seal segments (such as groove 36 in seal segment 26 in FIG. 9) are generally longitudinally aligned. In a second alternate arrangement, the grooves of circumferentially-adjacent seal segments (such as groove 38 in seal segment 26 in FIG. 9) are generally obliquely aligned with respect to the axis 18. A seal segment may have one or more grooves (such as the single groove 34 in seal segment 22 in FIGS. 1 and 3, or the three grooves 34, 36, and 38 in seal segment 26 in FIG. 9).

Figure 2:
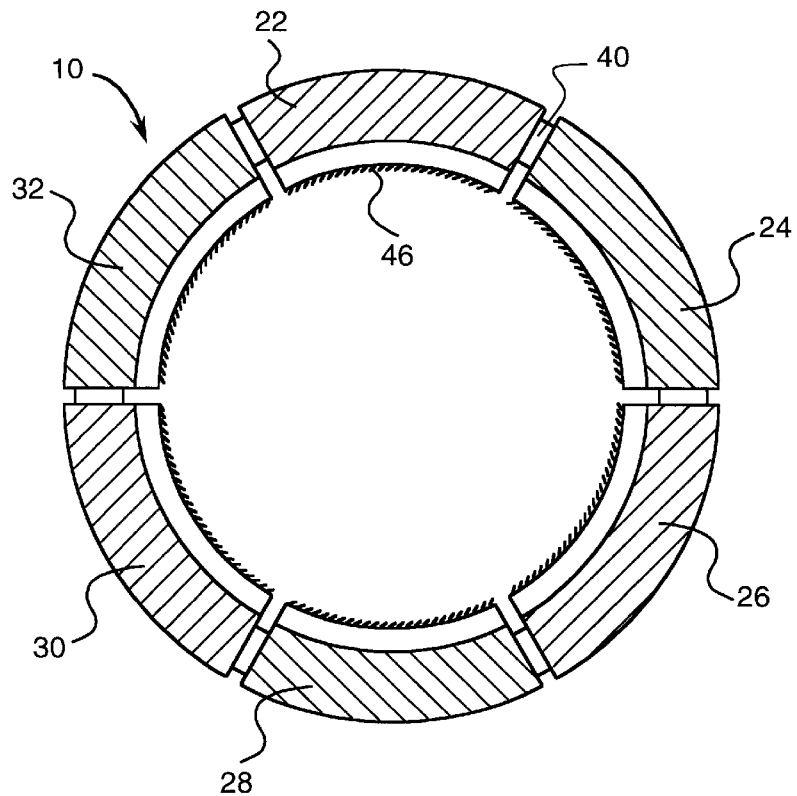
FIG. 2 is a cross sectional view of the seal segment of FIG. 1 taken along lines 2—2 of FIG. 1 circumferentially arrayed with the other seal segments (not shown in FIG. 1) of the seal assembly, wherein the seal segments are in their radially outward positions.

The seal assembly 10 also includes a resilient and imperforate member 40 engageable in the grooves of circumferentially-adjacent seal segments (such as member 40 engaged in groove 34 in seal segment 22 in FIGS. 1 and 3 and also seen in FIG. 2). When so engaged (i.e., when installed in the rotary machine 12), member 40 circumferentially urges apart the circumferentially-adjacent seal segments (such as segments 22 and 24 in FIG. 2). When installed in the rotary machine 12, the member 40 is said to be engaged in the grooves of circumferentially-adjacent seal segments. The member 40 being resilient defines a spring (which circumferentially urges apart circumferentially-adjacent seal segments) and being imperforate defines a seal (which minimizes longitudinal leakage across circumferentially-adjacent seal segments). It is noted that for non-radially-aligned grooves, the member being imperforate defines a seal which minimizes leakage along a direction perpendicular to a plane containing the circumferentially-adjacent grooves. Preferably, the member 40 is made of spring steel. The member 40 is shown alone in FIG. 4. In a preferred embodiment, the member 40, when viewed on end, has a general "C" shape (as shown in FIG. 6). Another preferred embodiment of the member 42 is shown in FIG. 7 wherein the member 42, when viewed on end, has a general "W" shape (as shown in FIG. 8).

The seal segments (such as seal segment 22 shown in FIGS. 1 and 3 and seal segment 26 shown in FIG. 9) preferably have a plurality of rows of labyrinth seal teeth 44.

In a preferred construction, such seal segments also have a plurality of brush seal bristles 46. The bristles 46 could provide some of the primary sealing with the labyrinth seal teeth 44 providing the rest of the primary sealing, the bristles 46 could provide all of the primary sealing with the labyrinth seal teeth 44 providing backup sealing in case of bristle failure, or the bristles 46 could provide all of the primary sealing without any labyrinth seal teeth backup sealing.

In operation, during startup of the rotary machine 12, each member 40 circumferentially pushes apart circumferentially-adjacent seal segments (such as seal segments 22 and 24). Such circumferential pushing apart inherently causes the seal segments to move radially outward, as is known to those skilled in the art. Increasing the radial distance between the labyrinth seal teeth 44 and the rotor 14 and the radial distance between the brush-seal bristles 46 and the rotor 14 protects the teeth 44 and the bristles 46 from damaging contact with a vibrating and oscillating rotor 14 during startup. By the time such transient rotor vibrations and oscillations have settled out during steady-state operating conditions, the rotary machine 12 has built up a gas or steam pressure differential longitudinally across the seal segments 22, 24, 26, 28, 30, and 32. Referring to FIG. 3, fluid from the high pressure side 48 of the seal segment 22 reaches the void area 50 of the channel 20 by passing through a conduit 52 (shown in dashed line) or by passing through clearance gaps between the seal segment 22 and the casing 16. Such high pressure fluid pushes the seal segment 22 radially inward against a ledge 54 in the channel 20 overcoming the opposing action of the member 40. During such steady-state operating conditions, the labyrinth seal teeth 44 and the bristles 46 are in close sealing proximity to the rotor 14. The member 40 provides sealing between circumferentially-adjacent sealing segments (such as seal segments 22 and 24) between the high pressure side 48 and the low pressure side 56 of the seal assembly 10. It is estimated that such inter-seal-segment sealing will decrease leakage in a typical utility-company steam turbine by generally up to fifty percent (compared to an identical steam turbine lacking the member 40 of the invention).

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A seal assembly for a rotary machine, said rotary machine including a rotor and a casing, said rotor having a generally longitudinally-extending axis, said casing generally coaxially aligned with said axis, said casing circumferentially surrounding and radially spaced apart from said rotor, said casing including an inner circumferential channel generally coaxially aligned with and open to said rotor, and said seal assembly comprising:

a) a plurality of seal segments disposable in a circumferential array in said channel; and, when so disposed, said plurality of seal segments movable between a radially inward position proximate said rotor and a radially outward position, and wherein circumferentially-adjacent seal segments have circumferentially-opposing and generally matching surface grooves, and b) a resilient and imperforate member engageable in said grooves of said circumferentially-adjacent seal segments and, when so engaged, said member circumferentially urging apart said circumferentially-adjacent seal segments, wherein, when so disposed, said seal segments have a radial extent, and wherein said grooves of said circumferentially-adjacent seal segments extend a radial distance equal to at least three-quarters of said radial extent of said seal segments.

2. The seal assembly of claim 1, wherein said grooves of said circumferentially-adjacent seal segments are generally radially aligned.

3. The seal assembly of claim 1, wherein said grooves of said circumferentially-adjacent seal segments are generally longitudinally aligned.

4. The seal assembly of claim 1, wherein said member, when viewed on end, has a general "W" shape.

5. The seal assembly of claim 1, wherein said member, when viewed on end, has a general "C" shape.

6. The seal assembly of claim 1, wherein said rotor is a steam-turbine rotor, wherein said casing is a steam-turbine casing, and wherein said segments includes a plurality of brush seal bristles.

7. The seal assembly of claim 6, wherein said segments also includes a plurality of rows of labyrinth seal teeth.

8. The seal assembly of claim 1, wherein said rotor is a steam-turbine rotor, wherein said casing is a steam-turbine casing, and wherein said segment includes a plurality of rows of labyrinth seal teeth.

9. A seal assembly for a rotary machine, said rotary machine including a rotor and a casing, said rotor having a generally longitudinally-extending axis, said casing generally coaxially aligned with said axis, said casing circumferentially surrounding and radially spaced apart from said rotor, said casing including an inner circumferential channel generally coaxially aligned with and open to said rotor, and said seal assembly comprising:

a) a plurality of seal segments disposable in a circumferential array in said channel; and, when so disposed, said plurality of seal segments movable between a radially inward position proximate said rotor and a radially outward position, and wherein circumferentially-adjacent seal segments have circumferentially-opposing and generally matching surface grooves, and b) a resilient and imperforate member engageable in said grooves of said circumferentially-adjacent seal segments and, when so engaged, said member circumferentially urging apart said circumferentially-adjacent seal segments, wherein said grooves of said circumferentially-adjacent seal segments are generally radially aligned, wherein, when so disposed, said seal segments have a radial extent, and wherein said grooves of said circumferentially-adjacent seal segments extend a radial distance equal to at least three-quarters of said radial extent of said seal segments.

10. A seal assembly for a rotary machine, said rotary machine including a rotor and a casing, said rotor having a generally longitudinally-extending axis, said casing generally coaxially aligned with said axis, said casing circumferentially surrounding and radially spaced apart from said rotor, said casing including an inner circumferential channel generally coaxially aligned with and open to said rotor, and said seal assembly comprising:

a) a plurality of seal segments disposable in a circumferential array in said channel; and when so disposed, said plurality of seal seaments movable between a radially inward position proximate said rotor and a radially outward position, and wherein circumferentially-adjacent seal segments have circumferentially-opposing and generally matching surface grooves, and b) a resilient and imperforate member engageable in said grooves of said circumferentially-adjacent seal segments and, when so engaged, said member circumferentially urging apart said circumferentially-adjacent seal segments, wherein said grooves of said circumferentially-adjacent seal segments are generally obliquely aligned with respect to said axis.

11. A rotary machine comprising:

a) a rotor having a generally longitudinally-extending axis;

b) a casing generally coaxially aligned with said axis, circumferentially surrounding and radially spaced apart from said rotor, and including an inner circumferential channel generally coaxially aligned with and open to said rotor;

c) a plurality of seal segments circumferentially arrayed in said channel and movable between a radially inward position proximate said rotor and a radially outward position, wherein circumferentially-adjacent seal segments have circumferentially-opposing and generally matching surface grooves, and d) a resilient and imperforate member engaged in said grooves of said circumferentially-adjacent seal segments and circumferentially urging apart said circumferentially-adjacent seal segments, wherein said seal segments have a radial extent, and wherein said grooves of said circumferentially-adjacent seal segments extend a radial distance equal to at least three-quarters of said radial extent of said seal segments.

12. The rotary machine of claim 11, wherein said grooves of said circumferentially-adjacent seal segments are generally radially aligned.

13. The rotary machine of claim 11, wherein said grooves of said circumferentially-adjacent seal segments are generally longitudinally aligned.

14. The rotary machine of claim 11, wherein said member, when viewed on end, has a general "W" shape.

15. The rotary machine of claim 11, wherein said member, when viewed on end, has a general "C" shape.

16. The rotary machine of claim 11, wherein said rotor is a steam-turbine rotor, wherein said casing is a steam-turbine casing, and wherein said segments includes a plurality of brush seal bristles.

17. The rotary machine of claim 16, wherein said segments also includes a plurality of rows of labyrinth seal teeth.

18. The rotary machine of claim 11, wherein said rotor is a steam-turbine rotor, wherein said casing is a steam-turbine casing, and wherein said segments includes a plurality of rows of labyrinth seal teeth.

19. A rotary machine comprising:

a) a rotor having a generally longitudinally-extending axis;

b) a casing generally coaxially aligned with said axis, circumferentially surrounding and radially spaced apart from said rotor, and including an inner circumferential channel generally coaxially aligned with and open to said rotor;

c) a plurality of seal segments circumferentially arrayed in said channel and movable between a radially inward position proximate said rotor and a radially outward position, wherein circumferentially-adjacent seal segments have circumferentially-opposing and generally matching surface grooves, and d) a resilient and imperforate member engaged in said grooves of said circumferentially-adjacent seal segments and circumferentially urging apart said circumferentially-adjacent seal segments, wherein said grooves of said circumferentially-adjacent seal segments are generally radially aligned, wherein said seal segments have a radial extent, and wherein said grooves of said circumferentially-adjacent seal segments extend a radial distance equal to at least three-quarters of said radial extent of said seal segments.

20. A rotary machine comprising:

a) a rotor having a generally longitudinally-extending axis;

b) a casing generally coaxially aligned with said axis, circumferentially surrounding and radially spaced apart from said rotor, and including an inner circumferential channel generally coaxially aligned with and open to said rotor;

c) a plurality of seal segments circumferentially arrayed in said channel and movable between a radially inward position proximate said rotor and a radially outward position, wherein circumferentially-adjacent seal segments have circumferentially-opposing and generally matching surface grooves, and d) a resilient and imperforate member engaged in said grooves of said circumferentially-adjacent seal segments and circumferentially urging apart said circumferentially-adjacent seal segments, wherein said grooves of said circumferentially-adjacent seal segments are generally obliquely aligned with respect to said axis.

* * * * *